United States Patent Office 3,540,893
Patented Nov. 17, 1970

3,540,893
GLASS YIELDING GLASS CERAMIC OF MODERATELY LOW EXPANSION, AND METHOD
Richard W. Petticrew, Perrysburg, Ohio, assignor to Owens-Illinois, Inc., a corporation of Ohio
No Drawing. Filed Nov. 9, 1964, Ser. No. 410,016
Int. Cl. C04b 33/00
U.S. Cl. 106—39                         3 Claims

ABSTRACT OF THE DISCLOSURE

Glasses containing $SiO_2$, $Al_2O_3$, MgO, CaO, $Li_2O$, $TiO_2$ and alkali metal oxides are thermally crystallized to exeptionally strong partially crystalline ceramics exhibiting a differential in thermal expansion coefficient between the surface and the interior having a moderately low lineal coefficient of thermal expansion greater than $30 \times 10^{-7}/°C$.

---

This invention relates to new glass compositions capable of being thermally crystallized to strong partly crystalline ceramics. In a particular aspect, the invention relates to said crystalline ceramic products and to a method for their production.

In United States Pat. No. 3,117,881 to Kenneth M. Henry and Wiliam E. Smith, patented Jan. 14, 1964, there is disclosed a family of ceramics made by thermal in situ crystallization of glass, which cermics have generally high flexural strengths. However, these ceramics in general have relatively high coefficients of thermal expansion and their resistance to damage by thermal shock is therefore somewhat limited by this property. Also, these high strength glass-ceramics are very high melting and have generally high liquidus temperatures. In copending application, Ser. No. 352,958 to William E. Smith, filed Mar. 18, 1964, now Pat. No. 3,380,818, there is disclosed a family of ceramics made by in situ crystallization of glass which have excellent thermal shock resistance because of their low coefficients of expansion. While this family of ceramics have very good flexural strengths compared to ordinary ceramics and other known low expansion ceramics made by in situ crystallization of glass, it is desirable for many uses to have even stronger glass-cermics.

It is an object of the invention to provide new thermally crystallizable glasses which are relatively easy to melt from batch materials and are capable of being thermally in situ crystallized to high strength partially crystalline ceramic material.

It is a further object of the present invention to provide new partially crystalline ceramic materials and a method for making them.

Other objects, as well as aspects and advantages, of the invention will become apparent from the ensuing detailed description.

I have now discovered glass compositions that are relatively easy to melt and yet have exceptionally high flexural strengths as well as moderately low coefficients of thermal expansion, after they have been converted to partially crystalline ceramic materials by heat treatment to cause in situ crystallization.

According to the present invention there is provided a thermally crystallizable glass composition composed of at least 90 weight percent $SiO_2+Al_2O_3+Li_2O+CaO+MgO+TiO_2+ZrO_2$ said glass composition containing the following components in the indicated ranges:

| Component | Weight percent |
|---|---|
| $SiO_2$ | 60–74 |
| $Al_2O_3$ | 13–17 |
| MgO | 2–7 |
| CaO | 2–7 |
| $Li_2O$ | 1.5–2 |
| $TiO_2$ | 1–7 |
| $ZrO_2$ | 0–2 |
| $Na_2O$ | 0–6 |
| $K_2O$ | 0–4 |
| $(Li_2O+TiO_2)$ | 3–9 |
| $(TiO_2+ZrO_2)$ | 2–8 |
| $(Na_2O+K_2O)$ | 2.5–6 |
| $(CaO+MgO)$ | 6–13 |

The glasses of the present invention consist essentially of the components of the foregoing paragraph in the indicated ranges but small amounts of other compatible glass-forming components, such as inorganic oxides and halides, can be included, e.g., up to about 3% BaO or SrO, up to about 4% $B_2O_3$ or $P_2O_5$, up to 1% ZnO or F (of course, F is present in combined form as a fluoride), and small amounts of colorants such as NiO and CoO, etc.

When the present glasses are crystallized by thermal treatment, a multitude of crystals are formed in situ throughout the body, and these are embedded in the residual glassy matrix. These crystals make the body decidely more refractory and resistant to thermal deformation. Such crystals are essentially all less than 30 microns across in their largest lineal dimension.

The crystallized body is exceptionally strong, having a high flexural strength. The lineal coefficient of thermal expansion of such bodies is greater than $30 \times 10^{-7}$ over the range from zero to 300° C. While the precise explanation for the high flexural strength is not known, it has been found that the bodies have a compressive layer on the surface. It is theorized that this layer has a higher proportion of low expansion lithium-containing crystals than the interior of the body, thus creating a compressive layer.

In any event, the lower limit of $Li_2O$ is about 1.5 weight percent of the glass and of the ceramic product made therefrom because, in general, a substantially lower amount results in decreased strength of the body, presumably, because too little lithium-containing crystals are formed on the surface. On the other hand, when much over 2 percent $Li_2O$ is present the strength of the body is also lower, presumably because too many low expansion lithium-containing crystals are formed in the interior of the body, resulting in too low a coefficient of expansion of the overall body and, therefore, an insufficient differential in the thermal expansion coefficients of the surface and interior portions of the body or article.

According to the method of the invention, a glass of the invention is melted and is thereafter formed by conventional means such as press molding, casting, blow molding, tube drawing, or the like. Useful shapes and objects are easily formed in this manner, such as tableware, and such articles as plates, cups and saucers can be made by pressing in a mold or by blow molding techniques.

In any event, the method of the invention comprises treating the formed glass object which has been cooled down to about its annealing point or lower, in an initial low temperature heat treatment range to form many nuclei or crystallites, and thereafter heating at a higher temperature to complete the crystallization to the desired degree. The optimum heat treatment schedule depends, as will be understood, on the particular glass composition and its tendency to form nuclei, the rate of formation of nuclei and the rate of crystallization. Therefore, it is not possible to specify a heat treatment schedule that will be common to all the glasses of the invention.

However, it is usually preferred that the first-mentioned low temperature heat treatment be in a range of temperatures which promotes a high rate of formation of nuclei or crystallites, wherein "nuclei" are defined as submicroscopic precursors of crystalline species or as a finely dispersed submicroscopic immiscible glassy phase. The "high rate" of nuclei formation employed in a given instance is not necessarily the highest absolute rate of nuclei formation, but, nevertheless, the initial "nuclei-forming" heat treatment temperature is chosen so that the rate of nuclei formation is high relative to the rate of crystal growth at the chosen temperature. The mechanism of crystal initiation for the present glasses is not definitely known, nor is it known whether the first phase that separates during the crystallization heat treatment schedule is an immiscible glassy phase or is a separate crystallite or crystalline phase. Also, it is difficult to measure directly the range of temperatures in which the high rates of nuclei formation occur, or in other words, where the optimum temperature range for the initial heat treatment is to be located. However, this temperature range usually is in the range from 30° F. below the annealing point of the glass to 250° or 300° F. above the annealing point. The annealing point, as defined herein, can be determined by ASTM designation C336–54T, with the testing apparatus being calibrated using fibers of standard glasses having known annealing and strain points as specified and published by the National Bureau of Standards.

While the temperature range for high rates of nuclei formation is difficult to measure directly, the optimum initial low temperature heat treatment range can be empirically determined employing small droplets of the glass and a micro-furnace capable of very rapid temperature change and accurate temperature control. A droplet of the glass, cooled to below the annealing point temperature, can be rapidly heated in the micro-furnace to a specific temperature, say, between 30° F. below the annealing point and 250° F. above the annealing point, and held at such temperature for a specified time interval, the length of time of heating depending, again, upon the particular glass. Thus, if the glass inherently very rapidly forms nuclei, a shorter standard time at the low temperature can be used than if the nuclei are relatively only slowly formed. In any event, as an example, a droplet of the glass can be heated for, say, 15 minutes at 60° F. above the annealing point temperature. Thereafter the droplet of glass in the micro-furnace can be very rapidly heated to a predetermined crystallization temperature, for instance, to a suitable temperature within the range 1600–1900° F., and held at such predetermined temperature for a specific length of time, for instance, one-half hour. This process can be repeated, using the same length of time of initial and final heating and the same temperature of final heating, but using different initial heating temperatures, say 40°, 80°, 100°, and 120° F. above the annealing point temperature. Thereafter by microscopic examination, one can determine which initial heat treatments resulted in formation of the most and smallest crystals, and thus determine the approximate temperature range where a maximum number of crystallization centers are formed. Thereafter, an optimum heat treatment schedule can be worked out by varying the length of time in the initial heat treatment range that appears to be optimum and by varying time and temperatures of heating in the final crystallization heat treatment range. Properties such as the fineness of the crystals and the strength of samples treated according to various temperature schedules can be determined as an aid in picking an optimum heat treatment schedule for the properties desired.

The process of the invention thus usually comprises heat treating the formed article in an optimum initial temperature range between 30° F. below the annealing point and about 250° F. or 300° F. above the annealing point for a time of at least one-half hour, usually at least one hour, and thereafter heat treating in a higher crystallization temperature range. Where deformation or slumping is a problem, it is usually necessary that the initial heat treatment include at least a one-half hour period at a temperature not over about 175 to 200° F. above the annealing point temperature. The time of initial heat treatment in the range from 30° F. below to 300° F. above the annealing point has no upper limit; usually it is not more than 5 or 6 hours, but longer times are not usually in the least harmful. In fact, in heat treating thick articles it is often advantageous to use very long times up to a day or a week or more at the lower temperatures in this range, in order to obtain more uniform treatment throughout the thickness of the article.

The crystallization heat treatment stage is effected at higher temperatures, usually in the range from about 1500–2000° F., with a sufficient length of time of heating in the high temperature range to effect in situ crystallization to at least the extent that the resulting glass-ceramic product, after cooling to room temperature and reheating, will not substantially deform under its own weight when held for one hour at a temperature 300° F. above the annealing point of the original glass. Thus, a rod, 5 inches long and ¼ inch in diameter, supported near each end by knife edges spaced 4 inches apart, will not deform or sag at the center under such conditions as much as ¼ inch. Obviously, a degree of crystallization that passes this test represents a rather highly crystalline material, since glass or glass with only around 5% crystalline material would obviously deform badly when held at a temperature so far above its annealing point. However, it is not possible to determine the exact relative amounts of crystalline and vitreous material in such densely crystallized materials as are produced by the present invention. Generally, times of heating in the temperature range of 1500 to 2000° F. are from 15 minutes to 6 hours, usually from ½ hour to 4 hours. Again, however, much longer times can be employed in lower temperature ranges to obtain very uniform crystallization.

In any event, the overall heat treatment chosen, that is, the initial or nucleation heat treatment and the crystallization heat treatment, effected at the higher temperature, results in an at least partially crystalline ceramic body whose entire interior contains a multitude of randomly oriented, substantially homogeneously dispersed crystals, essentially all of which crystals are in their largest lineal dimension less than 30 microns across. The products are densely crystallized, hard, and nonporous.

As will be understood, when going from the initial or nucleation heat treatment temperature to the higher crystallization temperature, it is usually preferred to proceed slowly enough, or to stop at intermediate plateaus long enough, to effect appreciable crystallization in the intermediate temperature range, at least to such a degree that a sufficiently rigid crystalline network is formed that prevents the article from slumping. Of course, in heat treating articles such as flat plates that can be cast in a mold and heat treated in the mold, the slumping problem is not important and not as much care need be exercised.

Although the specific examples shown hereafter in Table I show several plateaus of heat treatment temperatures, the entire heat treatment can be effected using slowly and continuously rising temperatures, and it is often desirable to employ different heating rates at various stages of the heating process. For instance, in the nucleation heat treatment temperature range the heating rate is usually slower than when going from this lower temperature range to the final crystallization temperature range.

The glasses of the invention can be melted in the normal manner in gas-fired furnaces, preferably using slightly oxidizing conditions, or in electric furnaces. Electric boosting can be provided in gas-fired furnaces where desired. In the laboratory platinum crucibles can be used. In larger furnaces high quality refractories are employed, such as high-alumina refractories. When employing alumina refractories, it must be remembered that some alumina may enter the composition from the refractories, the amount depending in part upon the volume of charge in relation to the surface area of the furnace, temperature, length of time of melting, etc. Some adjustment in the batch composition may be necessary to account for the alumina from the refractory.

In a typical example of the invention, the following batch materials were melted at a glass temperature of about 2700° F. in a platinum crucible in a gas-fired furnace using slightly oxidizing conditions. Melting time was 21 hours, with mechanical stirring. The batch is shown below, together with the resulting glass composition in parts by weight:

|  | Parts by weight |  | Parts by weight |
|---|---|---|---|
| Petalite [1] | 2,023.8 | $SiO_2$ | 62.9 |
| Flint [2] | 1,583.2 | $Al_2O_3$ | 14 |
| Alcoa A-10 alumina [3] | 374.3 | MgO | 6 |
| MgO [4] | 306.1 | $Li_2O$ | 1.7 |
| Titanox [5] | 216.1 | $TiO_2$ | 4.3 |
| Sodium carbonate | 256.4 | $Na_2O$ | 3.1 |
| Calcium carbonate | 446.4 | CaO | 5 |
| Boric anhydride | 150.0 | $B_2O_3$ | 3 |

[1] 4.2% $Li_2O$, 16.2% $Al_2O_3$, 77.7% $SiO_2$, 0.4% $Na_2O$, 0.2% $K_2O$ and 0.027% $Fe_2O_3$, and other minor impurities, including 1% ignition loss.
[2] 99.9+% $SiO_2$.
[3] 99.5% $Al_2O_3$, 0.03% $Fe_2O_3$, 0.1% $Na_2O$, 0.08% $SiO_2$, 0.2+% ignition loss.
[4] 98% purity.
[5] Substantially pure $TiO_2$.

A number of rods were pulled from the homogeneous glass melt, and the rods were thermally crystallized in situ after cooling, using the following heat treatment schedule:

| Degrees F.— | Hours |
|---|---|
| 1300 | 2 |
| 1450 | 2 |
| 1550 | 1 |

The rods were slowly cooled in the furnace by simply shutting off the power. The average abraded modulus of rupture value (flexural strength) was 66,000 p.s.i. The modulus of rupture determination was carried out as will be described hereinafter. Other properties of the glass and of the ceramic produced by the foregoing heat treatment are set forth in Table I, Example 1. Also, five ounce tumblers were molded. The glass tumblers were heat treated using the following schedule:

| Degrees F.— | Hours |
|---|---|
| 1250 | 2 |
| 1350 | 2 |
| 1700 | 1 |

The tumblers were strong and opaque white.

The following Table I sets forth exemplary compositions of glasses and resulting in situ crystallized ceramics of the invention having the properties of the ceramics of the invention set forth hereinbefore, which glasses were melted in a manner similar to the preceding example. Heat treatment schedules are given, and in most instances the modulus of rupture values were determined and are set forth in the table. In the table the symbol MR stands for the modulus of rupture (flexural strength) in thousands of lbs. per square inch. The coefficients of expansion shown for the glasses and the crystallized materials were determined from cane samples of the glass and of the thermally in situ crystallized final products.

TABLE I

|  | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 62.9 | 63 | 63 | 63 | 62 | 66 | 64 | 66 | 63.2 | 67.4 | 69.4 | 70.4 | 70.4 |
| $Al_2O_3$ | 14 | 14 | 14 | 14 | 14 | 14 | 15 | 15 | 14 | 15 | 15 | 15 | 15 |
| MgO | 6 | 6 | 6 | 6 | 6 | 6 | 6 | 6 | 6 | 6 | 4 | 4 | 4 |
| CaO | 5 | 5 | 5 | 5 | 6 | 5 | 5 | 3 | 5 | 3 | 3 | 3 | 3 |
| $Li_2O$ | 1.7 | 2 | 2 | 2 | 2 | 1.7 | 1.5 | 1.6 | 1.5 | 1.6 | 1.6 | 1.6 | 1.6 |
| $TiO_2$ | 4.3 | 4 | 4 | 4 | 2 | 4.3 | 4 | 4 | 4.3 | 4 | 4 | 2 | 2 |
| $ZrO_2$ |  |  |  |  |  |  |  |  |  |  |  | 1 | 1 |
| $Na_2O$ | 3.1 | 3 |  | 2 | 5 | 3 | 3 | 3 | 3 | 3 | 3 | 3 |  |
| $K_2O$ |  |  | 3 | 1 |  |  |  |  |  |  |  |  | 3 |
| $B_2O_3$ | 3 | 3 | 3 | 3 | 3 |  | 1.5 | 1.4 | 3 |  |  |  |  |
| F |  |  |  |  |  |  |  | 0.2 |  | 0.2 | 0.2 | 0.2 | 0.2 |
| Liquidus, ° F. | 2,110 | 2,100 | 2,135 | 2,135 | 2,090 | 2,155 | 2,180 | 2,185 | 2,120 | 2,190 | 2,115 | 2,240 | 2,240 |
| Log 4η, ° F. | 2,025 | 2,190 | 2,200 | 2,150 | 1,995 | 2,120 | 2,135 | 2,200 | 2,075 | 2,215 | 2,250 | 2,390 | 2,430 |
| A.P., ° F. | 1,125 |  |  |  | 1,075 |  | 1,155 |  |  | 1,170 | 1,180 | 1,225 | 1,225 |
| α glass (25–300° C.) | 45×10⁻⁷ |  |  |  |  |  |  |  |  |  |  |  |  |
| α Xstal (25–300° C.) | 43×10⁻⁷ |  |  | 48×10⁻⁷ |  |  |  | 52.5×10⁻⁷ |  |  |  |  |  |
| Heat treatment (° F., hrs.) | 1,300-2 1,450-2 1,550-1 | 1,300-2 1,450-2 1,850-1 | 1,300-2 1,450-2 1,850-1 | 1,250-2 1,400-2 1,900-1 | 1,300-2 1,700-1 | 1,200-2 1,400-2 1,500-1 | 1,150-2 1,450-2 1,600-1 | 1,250-2 1,500-2 1,800-1 | 1,300-2 1,350-1 1,400-1 1,650-1 | 1,300-2 1,500-2 1,700-4 | 1,300-2 1,350-2 1,750-1 | 1,300-2 1,400-2 1,750-1 | 1,350-1 1,400-2 1,750-1 |
| Modulus of rupture | 66 | Strong | Strong | Strong | Strong | 50 | 37 | 54 | 33 | 68 | 66 | 47 | 54 |

In Table I, the annealing points are shown for only a few of the examples. However, enough annealing points were determined to know that the heat treatment schedules were in accordance with the usual ranges set forth in the previous discussion of the method of crystallization. The annealing points which were determined and are shown were not determined by the precise ASTM method, and are therefore only approximate. They were, however, accurate enough to serve as a guide for establishing the heat treatment schedules. Also, while the liquidus temperatures shown were carefully determined by a fairly precise method employing platinum boats in a gradient furnace, they are not as precise as the quenching and melting methods used for the most careful phase diagram work. Also, the values given for the temperature at which the logarithm of the viscosity of the glass in poises is 4, are values extrapolated from higher temperatures and so are subject to some experimental error. However, viscosities and other measured properties are reported in the table so that those skilled in the art will have a fuller understanding of the general working properties of the present glasses.

The tested flexural strength of the crystallized material was determined using crystallized cane samples, usually of about 0.20 inch in diameter, and in all cases from 0.15 to 0.5 inch in diameter. The modulus of rupture tests were made using a Tinuis-Olsen testing machine. This machine applies a measured load through a single knife edge to the center of a 4 inch long sample of cane supported on two knife edges (3-point loading). The load is applied at a constant rate of 24 pounds per minute until failure occurs, with a marker indicating the highest load applied to the point of failure. Before the cane samples are tested they are abraded uniformly by rotating in a slow-speed drill press in contact with 320-grit emery paper under hand pressure. This technique assures that the abrasions are parallel to the direction of loading. A dial micrometer calibrated in inches and equipped with a bar contact instead of a point contact is used to measure maximum and minimum diameters at the center of the sample to an accuracy of 0.0005 inch. Since few cane samples are perfectly round, the load is applied normal to the maximum diameter and the standard formula for an elliptical cross-section is used in calculating the modulus of rupture as follows:

$$MR = \frac{Load(lbs._2) \times 8 \times span (in.)}{(D_1 \times D_2)\pi}$$

Each value reported in Table I is the avearge of a number of cane samples so tested.

As will be evident to those skilled in the art, modifications of this invention can be made or followed in the light of the foregoing disclosure without departing from the spirit and scope of the disclosure or from the scope of the claims.

I claim:

1. A thermally crystallizable glass containing the following essential components, present in the glass in the indicated weight percentage ranges:

| Component | Weight percent |
|---|---|
| $SiO_2$ | 60–74 |
| $Al_2O_3$ | 13–17 |
| MgO | 2–7 |
| CaO | 2–7 |
| $Li_2O$ | 1.5–2 |
| $TiO_2$ | 1–7 |
| $ZrO_2$ | 0–2 |
| $Na_2O$ | 0–6 |
| $K_2O$ | 0–4 |
| $(Li_2O+TiO_2)$ | 3–9 |
| $(TiO_2+ZrO_2)$ | 2–8 |
| $(Na_2O+K_2O)$ | 2.5–6 |
| $(CaO+MgO)$ | 6–13 | said glass consisting of at least 90 weight percent

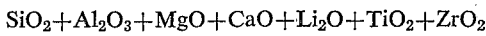

$SiO_2+Al_2O_3+MgO+CaO+Li_2O+TiO_2+ZrO_2$

2. A method for making a partially crystalline ceramic article exhibiting a difference in thermal expansion coefficient between the surface and the interior due to the selected lithia range, which comprises making a thermally crystallizable glass melt containing the following essential components, present in the glass in the indicated weight percentage ranges:

| Component | Weight percent |
|---|---|
| $SiO_2$ | 60–74 |
| $Al_2O_3$ | 13–17 |
| MgO | 2–7 |
| CaO | 2–7 |
| $Li_2O$ | 1.5–2 |
| $TiO_2$ | 1–7 |
| $ZrO_2$ | 0–2 |
| $Na_2O$ | 0–6 |
| $K_2O$ | 0–4 |
| $(Li_2O+TiO_2)$ | 3–9 |
| $(TiO_2+ZrO_2)$ | 2–8 |
| $(Na_2O+K_2O)$ | 2.5–6 |
| $(CaO+MgO)$ | 6–13 | said glass consisting of at least 90 weight percent

$SiO_2+Al_2O_3+MgO+CaO+Li_2O+TiO_2+ZrO_2$ forming a glass article of predetermined size and shape from said glass melt; and thereafter thermally crystallizing said article, by in situ crystallization, to a partially crystalline ceramic product having a moderately low lineal coefficient of thermal expansion greater than $30 \times 10^{-7}/°$ C. over the range from zero to 300° C., said ceramic product containing a multitude of substantially homogeneously dispersed crystals, essentially all of which crystals are in their largest lineal dimension less than 30 microns across.

3. A partially crystalline ceramic exhibiting a difference in thermal expansion coefficient between the surface and the interior having a moderately low lineal coefficient of thermal expansion greater than $30 \times 10^{-7}/°$ C. over the range from zero to 300° C., and containing a multitude of substantially homogeneously dispersed crystals, essentially all of which crystals are in their largest lineal dimension less than 30 microns across, said ceramic articles having been formed from a glass by thermal in situ crystallization, said glass being a thermally crystallizable glass containing the following essential components, present in the glass in the indicated weight percentage ranges:

| Component | Weight percent |
|---|---|
| $SiO_2$ | 60–74 |
| $Al_2O_3$ | 13–17 |
| MgO | 2–7 |
| CaO | 2–7 |
| $Li_2O$ | 1.5–2 |
| $TiO_2$ | 1–7 |
| $ZrO_2$ | 0–2 |
| $Na_2O$ | 0–6 |
| $K_2O$ | 0–4 |
| $(Li_2O+TiO_2)$ | 3–9 |
| $(TiO_2+ZrO_2)$ | 2–8 |
| $(Na_2O+K_2O)$ | 2.5–6 |
| $(CaO+MgO)$ | 6–13 | said glass consisting of at least 90 weight percent

$SiO_2+Al_2O_3+MgO+CaO+Li_2O+TiO_2+ZrO_2$

References Cited

UNITED STATES PATENTS

| 2,920,971 | 1/1960 | Stookey | 106—39 |
| 3,117,881 | 1/1964 | Henry et al. | 106—39 |
| 3,148,994 | 9/1964 | Yoss | 106—39 |
| 3,380,818 | 4/1968 | Smith | 65—33 |

FOREIGN PATENTS 1,300,614  6/1962  France.

HELEN M. McCARTHY, Primary Examiner

W. R. SATTERFIELD, Assistant Examiner

U.S. Cl. X.R.

65—33; 106—52

PO-1050
(5/69)

UNITED STATES PATENT OFFICE
CERTIFICATE OF CORRECTION

Patent No. 3,540,893     Dated November 17, 1970

Inventor(s) Richard W. Petticrew

It is certified that error appears in the above-identified patent and that said Letters Patent are hereby corrected as shown below:

Column 7, lines 18 and 19 delete and insert as follows:

$$MR = \frac{Load\ (lbs.) \times 8 \times span\ (in.)}{(D_1{}^2 \times D_2)\pi}$$

SIGNED AND
SEALED
MAR 2 1971

(SEAL)
Attest:

Edward M. Fletcher, Jr.
Attesting Officer

WILLIAM E. SCHUYLER,
Commissioner of Pate